US010227481B2

(12) United States Patent
Koda et al.

(10) Patent No.: US 10,227,481 B2
(45) Date of Patent: Mar. 12, 2019

(54) RUBBER COMPOSITION, VULCANIZED RUBBER, AND TIRE

(71) Applicant: KURARAY CO., LTD., Kurashiki-shi (JP)

(72) Inventors: Daisuke Koda, Kamisu (JP); Kei Hirata, Kamisu (JP); Hiroshi Kanbara, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 491 days.

(21) Appl. No.: 14/780,802

(22) PCT Filed: Mar. 25, 2014

(86) PCT No.: PCT/JP2014/058194
§ 371 (c)(1),
(2) Date: Sep. 28, 2015

(87) PCT Pub. No.: WO2014/157145
PCT Pub. Date: Oct. 2, 2014

(65) Prior Publication Data
US 2016/0053097 A1     Feb. 25, 2016

(30) Foreign Application Priority Data
Mar. 29, 2013   (JP) ................. 2013-073562

(51) Int. Cl.
*C08L 9/06*    (2006.01)
*B60C 1/00*    (2006.01)
*C08K 3/04*    (2006.01)
*C08K 3/36*    (2006.01)
*C08L 9/00*    (2006.01)
*C08L 7/00*    (2006.01)

(52) U.S. Cl.
CPC     *C08L 9/06* (2013.01); *B60C 1/00* (2013.01); *C08K 3/04* (2013.01); *C08K 3/36* (2013.01); *C08L 7/00* (2013.01); *C08L 9/00* (2013.01); *Y02T 10/862* (2013.01)

(58) Field of Classification Search
CPC ................. C08L 7/00; C08L 9/00; C08L 9/06
See application file for complete search history.

(56) References Cited

U.S. PATENT DOCUMENTS

| 6,180,717 B1 | 1/2001 | Kawazura et al. |
| 6,355,728 B1 | 3/2002 | Kawazura et al. |
| 2003/0188818 A1 | 10/2003 | Drvol et al. |
| 2008/0110544 A1 | 5/2008 | Nakamura |
| 2010/0152368 A1 | 6/2010 | Hirayama et al. |
| 2014/0011944 A1 | 1/2014 | Kondo |

FOREIGN PATENT DOCUMENTS

| EP | 0 775 726 A1 | 5/1997 |
| EP | 0 919 580 A1 | 6/1999 |
| EP | 1 935 937 A1 | 6/2008 |
| JP | 3789606 B2 | 6/2006 |
| JP | 2007-191510 A | 8/2007 |
| JP | 2008-120895 A | 5/2008 |
| JP | 2008-120940 A | 5/2008 |
| JP | 2008-184551 A | 8/2008 |
| JP | 2009-114367 A | 5/2009 |
| JP | 2011-144349 A | 7/2011 |
| JP | 2011-256279 A | 12/2011 |
| WO | WO 2007/034898 A1 | 3/2007 |
| WO | WO 2012/165038 A1 | 12/2012 |

OTHER PUBLICATIONS

Extended European Search Report dated Jun. 13, 2016 in Patent Application No. 14776066.4.
International Search Report dated Jul. 1, 2014 in PCT/JP2014/058194.

*Primary Examiner* — Peter D. Mulcahy
(74) *Attorney, Agent, or Firm* — Oblon, McClelland, Maier & Neustadt, L.L.P.

(57) ABSTRACT

The invention relates to a rubber composition having a good processability, and simultaneously having a rolling resistance performance and hardness after vulcanization at high levels, with which the contamination of the mold for processing due to the bleeding-out of the plasticizer can be suppressed, and in which the migration of the plasticizer and so on is suppressed to a low level; a vulcanized rubber obtained by vulcanizing the rubber composition; and to a tire including the rubber composition as at least a part thereof. The rubber composition contains 100 parts by mass of rubber component (A) composed of at least one of a synthetic rubber and a natural rubber, 0.1 to 50 parts by mass of a diene polymer (B), 20 to 150 parts by mass of a filler (C), 0.1 to 10 parts by mass of a vulcanizing agent (D), 0.1 to 15 parts by mass of a vulcanization accelerator (E) and 0.1 to 15 parts by mass of vulcanization aid (F).

11 Claims, No Drawings

RUBBER COMPOSITION, VULCANIZED RUBBER, AND TIRE

TECHNICAL FIELD

The present invention relates to a rubber composition comprising a rubber component, a diene polymer, a filler and so on; a vulcanized rubber obtained by vulcanizing the rubber composition; and to a tire comprising the rubber composition as at least a part thereof.

BACKGROUND ART

Hitherto, in the application field of tires for which an abrasion resistance and a mechanical strength are required, there have been extensively used rubber compositions that are enhanced in mechanical strength by incorporating a filler such as carbon black or silica in a rubber component such as a natural rubber and a styrene-butadiene rubber. Since the rubber composition containing a filler has a high viscosity during the kneading, rolling and extrusion, a plasticizer such as a processed oil is used for the purpose of improving processability or flowability. Since such a plasticizer can soften the rubber composition after the molding process, the plasticizer also has a function as a softener of the rubber composition.

In the meantime, in the use as a tire described above, there is a problem that even if the rubber has suitable physical properties such as mechanical strength and hardness at the time of production, the performance of the rubber changes with time during the use for a long time. This is caused by the migration of the plasticizer from the inner side of the rubber to the outside. As a method for suppressing the change in the rubber performance due to the migration of the plasticizer, Patent Document 1, for example, discloses a rubber composition containing a petroleum hydrocarbon resin and a specific vulcanization accelerator; and Patent Document 2 discloses a rubber composition containing a diene liquid polymer, diene rubber component and a filler at a specific ratio.

However, the tires described in Patent Documents 1 and 2 do not simultaneously have a mechanical strength, a hardness, a rolling resistance performance and a processability at a sufficiently high level, so that further improvements are demanded.

As the methods for improving the processability of rubber compositions, a method in which carbon black having a large particle size is used, and a method in which the content of the carbon black is decreased are also known. However, these methods have a drawback in that the mechanical strength, abrasion resistance or hardness is deteriorated.

Thus, development of a material having a rolling resistance performance together with a low-migration performance of the plasticizer and so on is demanded.

PRIOR ART REFERENCES

Patent Document

Patent Document 1: JP 3789606 B
Patent Document 2: JP 2008-120895 A

SUMMARY OF THE INVENTION

Problem to be Solved by the Invention

The present invention was accomplished in view of the circumstances described above and provides a rubber composition simultaneously having processability, rolling resistance performance and hardness at high levels, and in which the migration of the plasticizer and so on is suppressed to a low level; a vulcanized rubber obtained by vulcanizing the rubber composition; and provides a tire comprising the rubber composition as at least a part thereof.

Means for Solving the Problem

As a result of an intensive study, the present inventors discovered that by using a specific conjugated diene polymer, the processability of the rubber composition is enhanced and the rubber composition exhibits excellent rolling resistance performance, mechanical strength and hardness, and the migration of the plasticizer and so on is suppressed to a low level. The present inventors further discovered that by using a specific conjugated diene polymer as the plasticizer, bleeding-out of the plasticizer and so on contained in the rubber composition to the surface of the rubber by the heat during the production is suppressed, so that the problem of the contamination of the mold for processing is also solved, to accomplish the present invention.

That is, the present invention provides the following [1] to [3]:

[1] A rubber composition comprising 100 parts by mass of rubber component (A) composed of at least one of a synthetic rubber and a natural rubber, 0.1 to 50 parts by mass of a diene polymer (B), 20 to 150 parts by mass of a filler (C), 0.1 to 10 parts by mass of a vulcanizing agent (D), 0.1 to 15 parts by mass of a vulcanization accelerator (E) and 0.1 to 15 parts by mass of vulcanization aid (F);
  wherein the vulcanization rate (t90) of the diene polymer (B) measured under the measuring conditions below is 25 minutes or less:
  measuring conditions
  To 100 parts by mass of the diene polymer (B), 70 parts by mass of carbon black of ASTM N330, 3.5 parts by mass of zinc oxide, 2 parts by mass of stearic acid, 1.5 parts by mass of sulfur, 1.2 parts by mass of N-(tert-butyl)-2-benzothiazole sulfenamide and part by mass of N-phenyl-N'-(1, 3-dimethylbutyl)-p-phenylenediamine are added, and a torque at 140° C. is measured using an oscillating type curemeter and vulcanization time to reach 90% vulcanization degree is measured.
[2] A vulcanized rubber obtained by vulcanizing the rubber composition.
[3] A tire comprising the rubber composition as at least a part thereof.

Effects of the Invention

By the present invention, a rubber composition simultaneously having processability, rolling resistance performance and hardness at high levels, and in which the migration of the plasticizer and so on is suppressed to a low level; a vulcanized rubber obtained by vulcanizing the rubber composition; and a tire comprising the rubber composition as at least a part thereof are provided. Further, by using a specific conjugated diene polymer as the plasticizer, bleeding-out of the plasticizer and so on (not only the diene polymer (B), but also the additives such as vulcanizing agent, vulcanization aid and antioxidant) contained in the rubber composition to the surface of the rubber is suppressed by the heat during the production, so that the contamination of the mold for processing is also reduced.

MODE FOR CARRYING OUT THE INVENTION

[Rubber Composition]

The rubber composition of the present invention comprises 100 parts by mass of rubber component (A) composed of at least one of a synthetic rubber and a natural rubber, 0.1 to 50 parts by mass of a diene polymer (B), 20 to 150 parts by mass of a filler (C), 0.1 to 10 parts by mass of a vulcanizing agent (D), 0.1 to 15 parts by mass of a vulcanization accelerator (E) and 0.1 to 15 parts by mass of vulcanization aid (F).

<Rubber Component (A)>

Examples of the rubber component include a styrene-butadiene rubber (hereinafter occasionally referred to as "SBR"), a butadiene rubber, an isoprene rubber, a butyl rubber, a halogenated butyl rubber, an ethylenepropylenediene rubber, a butadiene acrylonitrile copolymer rubber, a chloroprene rubber and a natural rubber. Among these rubbers, preferred are SBR, a butadiene rubber, an isoprene rubber and a natural rubber, and more preferred are SBR and a natural rubber. These rubbers may be used alone or in combination of any two or more thereof. As the rubber component (A), a solid rubber is preferred. The "solid rubber" means a rubber (a synthetic rubber and a natural rubber) which is not liquid but which can be handled in the form of a solid. The Mooney viscosity $ML_{1+4}$ at 100° C. thereof is usually within the range from 20 to 200.

[Synthetic Rubber]

In the present invention, in cases where a synthetic rubber is used as the rubber component (A), preferred are SBR, butadiene rubber, isoprene rubber, butyl rubber, halogenated butyl rubber, ethylenepropylenediene rubber, butadiene acrylonitrile copolymer rubber, chloroprene rubber and the like. Among these rubbers, SBR, isoprene rubber and butadiene rubber are more preferred, and SBR is still more preferred.

(SBR(A-I))

As SBR (A-I), there may be used those generally used in the applications of tires. More specifically, the SBR (A-I) preferably has a styrene content of from 0.1 to 70% by mass, more preferably from 5 to 50% by mass, still more preferably from 15 to 35% by mass, and still more preferably from 15 to 25% by mass. Also, the SBR (A-I) preferably has a vinyl content of from 0.1 to 60% by mass and more preferably from 0.1 to 55% by mass.

The weight-average molecular weight (Mw) of the SBR (A-I) is preferably from 100,000 to 2,500,000, more preferably from 150,000 to 2,000,000 and still more preferably from 200,000 to 1,500,000. When the weight average molecular weight of the SBR (A-I) falls within the above-specified range, the resulting rubber composition can be enhanced in both processability and mechanical strength.

In the present specification, the weight-average molecular weight is the value measured by the method described below in Examples.

The glass transition temperature of the SBR used in the present invention as measured by differential thermal analysis is preferably from −95° C. to 0° C. and more preferably from −95° C. to −5° C. When adjusting Tg of the SBR to the above-specified range, it is possible to suppress increase in viscosity of the SBR and enhance a handling property thereof.

<<Method for Producing SBR>>

The SBR usable in the present invention may be produced by copolymerizing styrene and butadiene. The method for producing the SBR is not particularly limited, and the SBR may be produced by any of an emulsion polymerization method, a solution polymerization method, a vapor phase polymerization method and a bulk polymerization method. Among these polymerization methods, especially preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying agent and then subjected to emulsion polymerization using a radical polymerization initiator.

As the emulsifying agent, there may be used a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent gives any adverse influence on stability of the polymerization.

Examples of the radical polymerization initiator include persulfates such as ammonium persulfate and potassium persulfate, organic peroxides and hydrogen peroxide.

In order to suitably adjust a molecular weight of the obtained E-SBR, there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature of the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating agent to the reaction system.

Examples of the terminating agent include amine compounds such as isopropyl hydroxyl amine, diethyl hydroxyl amine and hydroxyl amine; quinone compounds such as hydroquinone and benzoquinone; and sodium nitrite.

After terminating the polymerization reaction, an antioxidant may be added, if required. Further, after stopping the polymerization reaction, unreacted monomers may be removed from the resulting latex, if required. Thereafter, the obtained polymer is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer as a crumb. The thus recovered crumb is washed with water and dehydrated, and then dried using a band dryer or the like to obtain E-SBR. Upon coagulating the polymer, the latex may be previously mixed with an extender oil in the form of an emulsified dispersion to recover the polymer in the form of an oil-extended rubber.

(ii) Solution-Polymerized Styrene-Butadiene Rubber (S-SBR)

S-SBR may be produced by an ordinary solution polymerization method. For example, styrene and butadiene are polymerized in a solvent using an anionic polymerizable active metal, if required, in the presence of a polar compound.

Examples of the anionic polymerizable active metal include alkali metals such as lithium, sodium and potassium; alkali earth metals such as beryllium, magnesium, calcium, strontium and barium; and lanthanoid rare earth metals such as lanthanum and neodymium. Among these active metals, preferred are alkali metals and alkali earth metals, and more preferred are alkali metals. The alkali metals are more preferably used in the form of an organic alkali metal compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents may be usually used in such a range that a monomer is dissolved therein at a concentration of from 1 to 50% by mass.

s Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may be used in the form of an organic alkali metal amide by allowing a secondary amine such as dibutyl amine, dihexyl amine and dibenzyl amine to react therewith.

The polar compound used in the solution polymerization is not particularly limited as long as the compound do not cause deactivation of the reaction and can be ordinarily used for controlling a microstructure of butadiene moieties and distribution of styrene in a copolymer chain thereof. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature of the above polymerization reaction is usually from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to a reaction solution in a continuous or intermittent manner such that a compositional ratio between the styrene and butadiene in the polymerization system falls within a specific range.

The polymerization reaction may be stopped by adding an alcohol such as methanol and isopropanol as a terminating agent to the reaction system. In addition, before adding the terminating agent, there may be added a coupling agent such as tin tetrachloride, tetrachlorosilane, tetramethoxysilane, tetraglycidyl-1,3-bisaminomethyl cyclohexane and 2,4-tolylene diisocyanate which are capable of reacting with an active end of the polymer chain, or a chain end-modifying agent such as 4,4-bis(diethylamino)benzophenone and N-vinyl pyrrolidone. The polymerization reaction solution obtained after terminating the polymerization reaction may be directly subjected to drying or steam stripping to remove the solvent therefrom, thereby recovering the S-SBR as aimed. Before removing the solvent, the polymerization reaction solution may be previously mixed with an extender oil to recover the S-SBR in the form of an oil-extended rubber.

[Modified Styrene-Butadiene Rubber (Modified SBR)]

In the present invention, there may also be used a modified SBR produced by introducing a functional group into SBR. Examples of the functional group to be introduced include an amino group, an alkoxysilyl group, a hydroxyl group, an epoxy group and a carboxyl group.

As a method for producing the modified SBR, for example, a method in which a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethyl cyclohexane and 2,4-tolylene diisocyanate which are capable of reacting with an active end of the polymer chain; a chain end-modifying agent such as 4,4'-bis(diethylamino)benzophenone or N-vinyl pyrrolidone; or other additives described in JP 2011-132298 A may be exemplified.

In the modified SBR, the site of the polymer into which the functional group is introduced may be either a chain end or a side chain of the polymer.

(Isoprene Rubber (A-II))

The isoprene rubber may be a commercially available isoprene rubber which may be obtained by the polymerization using a Ziegler catalyst such as titanium tetrahalide-trialkyl aluminum catalysts, diethyl aluminum chloride-cobalt catalysts, trialkyl aluminum-boron trifluoride-nickel catalysts and diethyl aluminum chloride-nickel catalysts, a lanthanoid rare earth metal catalyst such as triethyl aluminum-organic acid neodymium salt-Lewis acid catalysts; and an organic alkali metal compound as used similarly for production of the S-SBR. Among these isoprene rubbers, preferred are isoprene rubbers obtained by the polymerization using the Ziegler catalyst because of a high cis isomer content thereof. In addition, there may also be used those isoprene rubbers having an ultrahigh cis isomer content which are produced using the lanthanoid rare earth metal catalyst.

The isoprene rubber has a vinyl content of 50% by mass or less, preferably 40% by mass or less, and more preferably 30% by mass or less. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably −20° C. or lower and more preferably −30° C. or lower.

The weight average molecular weight (Mw) of the isoprene rubber is preferably from 90,000 to 2,000,000 and more preferably from 150,000 to 1,500,000. When the Mw of the isoprene rubber falls within the above-specified range, the resulting rubber composition can exhibit a good processability and a good mechanical strength.

The isoprene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

(Butadiene Rubber (A-III))

The butadiene rubber may be a commercially available butadiene rubber which may be obtained by the polymerization using a Ziegler catalyst such as titanium tetrahalide-trialkyl aluminum catalysts, diethyl aluminum chloride-cobalt catalysts, trialkyl aluminum-boron trifluoride-nickel catalysts and diethyl aluminum chloride-nickel catalysts; a lanthanoid rare earth metal catalyst such as triethyl aluminum-organic acid neodymium salt-Lewis acid catalysts; and an organic alkali metal compound as used similarly for production of the S-SBR. Among these butadiene rubbers, preferred are butadiene rubbers obtained by the polymerization using the Ziegler catalyst because of a high cis isomer content thereof. In addition, there may also be used those butadiene rubbers having an ultrahigh cis isomer content which are produced using the lanthanoid rare earth metal catalyst.

The butadiene rubber has a vinyl content of 50% by mass or less, preferably 40% by mass or less, and more preferably 30% by mass or less. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably −40° C. or lower and more preferably −50° C. or lower.

The weight-average molecular weight of the butadiene rubber is preferably from 90,000 to 2,000,000, more preferably from 150,000 to 1,500,000, still more preferably 250,000 to 1,000,000, and still more preferably 350,000 to 700,000. When the weight-average molecular weight of the butadiene rubber falls within the above-specified range, the resulting rubber composition can exhibit a good processability and a good mechanical strength.

The butadiene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

As the rubber component, together with at least one of the SBR, the isoprene rubber and the butadiene rubber, there may be used one or more rubbers selected from the group consisting of a butyl rubber, a halogenated butyl rubber, an ethylenepropylenediene rubber, a butadiene-acrylonitrile copolymer rubber and a chloroprene rubber. The method for producing these rubbers is not particularly limited, and any suitable commercially available rubbers may also be used in the present invention.

In the present invention, when using the SBR, the isoprene rubber, the butadiene rubber and the other synthetic rubber in combination with the below-mentioned diene polymer (B), it is possible to improve the processability of the resulting rubber composition, the dispersibility of carbon black therein, the rolling resistance performance thereof, and the migration of the plasticizer and so on.

When using a mixture of two or more kinds of synthetic rubbers, the combination of the synthetic rubbers may be optionally selected unless the effects of the present invention are adversely influenced. Also, various properties of the resulting rubber composition such as a rolling resistance performance and an abrasion resistance may be appropriately controlled by selecting a suitable combination of the synthetic rubbers.

[Natural Rubber]

Examples of the natural rubber used as the rubber component (A) in the present invention include TSR such as SMR, SIR and STR; natural rubbers ordinarily used in tire industries, such as RSS; high-purity natural rubbers; and modified natural rubbers such as epoxidized natural rubbers, hydroxylated natural rubbers, hydrogenated natural rubbers and grafted natural rubbers. Among these natural rubbers, SMR20, STR20 and RSS#3 are preferred from the viewpoints of a less variation in quality and a good availability. These natural rubbers may be used alone or in combination of any two or more thereof.

The method for producing the rubber used as the rubber component (A) in the present invention is not restricted and commercially available rubbers may be employed.

In the present invention, by using the rubber component (A) and the diene polymer (B) described below in combination, the processability, the rolling resistance performance of the vulcanized rubber, and the migration of the plasticizer and so on may be improved. Further, the contamination of the mold for processing due to the bleeding-out of the plasticizer and so on may also be suppressed.

<Diene Polymer (B)>

The rubber composition of the present invention contains a diene polymer (B).

As the diene polymer (B) (hereinafter also referred to as "polymer (B)" for short) used in the present invention, a polymer obtained by polymerizing a conjugated diene as a monomer unit by the method described below is preferred. In the present invention, polymer (B) acts as a plasticizer. Since the migration of the polymer (B) from the inside of the vulcanized rubber to the outside is small, a vulcanized rubber exhibiting an excellent low-migration performance may be obtained. Further, since the polymer (B) has a high vulcanization rate, the polymer (B) hardly bleeds to the rubber surface from the inside of the rubber composition even if the polymer (B) is heated during the production, so that the contamination of the mold for processing may be suppressed. This is an advantageous effect for a rubber composition containing the polymer (B) in a large amount. For example, in cases where the rubber composition of the present invention is used as a tire, since the contamination of the mold for processing is small, the mold can be repeatedly used, which leads to the improvement of the productivity.

Further, by the present invention, not only the bleeding-out of the polymer (B) as the plasticizer, but also bleeding-out of the additives such as the vulcanizing agent, the vulcanization aid and the antioxidant may also be suppressed.

Examples of the conjugated diene constituting the polymer (B) include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Among these polymers, those containing monomer units of butadiene and/or isoprene are more preferred. Further, in view of the mold contamination-suppressing effect, the polymers containing monomer units of isoprene are preferred. These conjugated dienes may be used individually or two or more of them may be used in combination.

The polymer (B) may also be copolymerized with an aromatic vinyl compound. Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Among these compounds, styrene, α-methylstyrene and 4-methylstyrene are preferred.

The ratio of the monomer unit (a) in the copolymer to the total of the aromatic vinyl compound (a) and the conjugated diene (b) is preferably from 0 to 50% by mass, more preferably from 10 to 40% by mass and still more preferably 15 to 30% by mass, in view of the processability of the obtained rubber composition, the rolling resistance performance of the vulcanized rubber and the low-migration property, and in view of suppressing the contamination of the mold for processing.

The weight average molecular weight (Mw) of the polymer (B) is preferably from 2,000 to 100,000, more preferably from 8,000 to 90,000, still more preferably from 15,000 to 80,000, still more preferably from 30,000 to 70,000. When the Mw of the polymer (B) is within the range described above, the processability of the rubber composition of the present invention is good, and the dispersibility of the filler (C) in the rubber composition is improved, the rolling resistance performance of the vulcanized rubber is good. Further, the low-migration performance when the rubber composition is made into a vulcanized rubber is also improved, so that the contamination of the mold for processing may also be suppressed. The Mw of the polymer (B) used in the present specification is the value measured by the method described in the Examples below.

In the present invention, two types of polymer (B) having different Mw may be used in combination.

The polymer (B) is usually a liquid polymer and the melt viscosity thereof at 38° C. is preferably from 0.1 to 3,000 Pa·s, more preferably from 0.8 to 2,000 Pa·s, still more preferably from 10 to 1,000 Pa·s and still more preferably from 60 to 800 Pa·s. When the melt viscosity of the polymer (B) falls within the above-specified range, the resulting rubber composition can be easily kneaded and can be improved in processability, and the contamination of the mold for processing can also be suppressed. Further, the low-migration property when the rubber composition is made into a vulcanized rubber is also improved. In the present specification, the melt viscosity of the polymer (B) is the value measured by the method described below in Examples.

The molecular weight distribution (Mw/Mn) of the polymer (B) is preferably from 1.0 to 5.0, more preferably from 1.0 to 3.0, still more preferably from 1.0 to 1.8, and especially preferably from 1.0 to 1.5. When the molecular weight distribution (Mw/Mn) of the polymer (B) falls within the above-specified range, the resulting polymer (B) can suitably exhibit a less variation in viscosity thereof.

The glass transition temperature (Tg) of the polymer (B) may vary depending upon a vinyl content or the other monomer content thereof, and is preferably from −100 to 0° C., more preferably from −100 to −5° C., still more preferably from −100 to −10° C. When the glass transition temperature of the polymer (B) falls within the above-specified range, the resulting rubber composition can exhibit a good rolling resistance performance. Further, since the increase in the viscosity can be reduced, so that ease of handling is promoted. The vinyl content of the polymer (B) is preferably 99% by mass or less, more preferably 90% by mass or less, still more preferably 50% by mass or less and still more preferably 19% by mass or less. In the present specification, the vinyl content of the polymer (B) is the value measured by the method described below in Examples.

It is required that the vulcanization rate (t90) of the polymer (B) at 140° C. as measured by the time to reach 90% vulcanization degree be 25 minutes or less. The vulcanization rate (t90) is more preferably 23 minutes or less, still more preferably 20 minutes or less. The fact that the vulcanization rate (t90) of the polymer (B) is within the above-specified range means that the vulcanization rate of the polymer (B) is high, and the vulcanization rate when the rubber composition is made into a vulcanized rubber is increased by using such a polymer (B). As a result, the obtained vulcanized rubber is excellent in mold-releasing, and the bleeding-out property is improved. Further, when the vulcanization rate (t90) of the polymer (B) is within the above-specified range, increase in the viscosity of the rubber composition is rapid, so that the additives such as the plasticizer, vulcanization aid and antioxidant are hardly bled to the surface, so that the contamination of the mold for processing is suppressed. There is no particular lower limit of the vulcanization rate (t90) of the polymer (B), and is usually seconds or more. In the present specification, the vulcanization rate (t90) of the polymer (B) is the value measured under the following measuring conditions:

measuring conditions

To 100 parts by mass of the diene polymer (B), 70 parts by mass of carbon black of ASTM N330, 3.5 parts by mass of zinc oxide, 2 parts by mass of stearic acid, 1.5 parts by mass of sulfur, 1.2 parts by mass of N-(tert-butyl)-2-benzothiazole sulfenamide and part by mass of N-phenyl-N'-(1,3-dimethylbutyl)-p-phenylenediamine are added, and a torque at 140° C. is measured using an oscillating type curemeter (CURELASTOMETER) and vulcanization time to reach 90% vulcanization degree is measured.

Since the polymer (B) is not vulcanized by itself, under the above measuring conditions, a specific filler, vulcanizing agent, vulcanization accelerator, vulcanization aid and antioxidant were added to the polymer (B), the resulting mixture was subjected to the measurement, and the obtained measurement result was defined as the vulcanization rate (t90) of the polymer (B). In the Examples, measurements were performed under the above measuring conditions in accordance with JIS K 6300-2.

In the present invention, the content of the polymer (B) to 100 parts by mass of the rubber component (A) is from 0.1 to 50 parts by mass, preferably from 0.5 to 50 parts by mass, more preferably 1 to 40 parts by mass, and still more preferably from 2 to 35 parts by mass. When the content of the polymer (B) is within the above-specified range, processability and the mechanical strength, rolling resistance performance and low-migration performance of the rubber after vulcanization are good. The contamination of the mold for processing can also be suppressed.

The polymer (B) may be produced by bulk polymerization method, emulsion polymerization method, solution polymerization method or the like. Among these method, solution polymerization method is preferred.

(Bulk Polymerization Method)

As the bulk polymerization method, known methods may be employed. For example, bulk polymerization may be carried out by mixing the conjugated diene and the aromatic vinyl compound which are the raw materials under stirring, and starting the polymerization with a radical polymerization initiator in the absence of a solvent.

Examples of the radical polymerization initiator include azo compounds, peroxide compounds and redox compounds. Preferred examples include azoisobutylonitrile, tert-butylperoxy pivalate, di-tert-butyl peroxide, i-butyryl peroxide, lauroyl peroxide, succinic peroxide, dicinamyl peroxide, di-n-propylperoxy dicarbonate, tert-butylperoxyallyl monocarbonate, benzoyl peroxide, hydrogen peroxide and ammonium persulfate.

The polymerization temperature may appropriately be selected depending on the type of the radical polymerization initiator, and is preferably from 0 to 200° C., more preferably from 0 to 120° C. The polymerization method may be either a continuous polymerization method or a batch polymerization method. The polymerization reaction may be stopped by adding a terminating agent to the reaction system.

Examples of the terminating agent include amine compounds such as isopropyl hydroxyl amine, diethyl hydroxyl amine and hydroxyl amine; quinone compounds such as hydroquinone and benzoquinone; and sodium nitrite. Examples of the method of removing the residual monomers from the copolymer include reprecipitation method and distillation under heat under reduced pressure.

(Emulsion Polymerization Method)

The emulsion polymerization method for producing the polymer (B) may be any suitable conventionally known method. For example, a predetermined amount of a conjugated diene is emulsified and dispersed in the presence of an emulsifying agent, and then the resulting emulsion is subjected to emulsion polymerization using a radical polymerization initiator.

As the emulsifying agent, there may be used, for example, a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization.

Examples of the radical polymerization initiator include persulfates such as ammonium persulfate and potassium persulfate; and organic peroxides and hydrogen peroxide.

In order to adjust a molecular weight of the resulting polymer (B), there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature of the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating agent to the reaction system.

Examples of the terminating agent include amine compounds such as isopropyl hydroxyl amine, diethyl hydroxyl amine and hydroxyl amine; quinone compounds such as hydroquinone and benzoquinone; and sodium nitrite.

After stopping the polymerization reaction, an antioxidant may be added, if required. Further, after stopping the polymerization reaction, unreacted monomers may be removed from the resulting latex, if required. Thereafter, the resulting polymer (B) is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer (B). The thus recovered polymer is washed with water and dehydrated, and then dried to obtain the polymer (B). Upon coagulating the polymer, the latex may be previously mixed, if required, with an extender oil in the form of an emulsified dispersion to recover the polymer (B) in the form of an oil-extended rubber.

(Solution Polymerization Method)

The solution polymerization method for producing the polymer (B) may be any suitable conventionally known method. For example, the conjugated diene may be polymerized in a solvent using a Ziegler catalyst, a metallocene catalyst or an anionic polymerizable active metal, if required, in the presence of a polar compound.

Examples of the anionic polymerizable active metal include alkali metals such as lithium, sodium and potassium; alkali earth metals such as beryllium, magnesium, calcium, strontium and barium; and lanthanoid rare earth metals such as lanthanum and neodymium. Among these active metals, preferred are alkali metals and alkali earth metals, and more preferred are alkali metals. The alkali metals are more preferably used in the form of an organic alkali metal compound.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the conjugated diene polymer as required, and is preferably from 0.01 to 3 parts by mass with respect to 100 parts by mass of the conjugated diene.

The organic alkali metal compound may be used in the form of an organic alkali metal amide by allowing a secondary amine such as dibutyl amine, dihexyl amine and dibenzyl amine to react therewith.

The polar compound may be used in the anion polymerization for controlling a microstructure of conjugated diene moieties without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds. The polar compound is preferably used in an amount of from 0.01 to 1,000 mol equivalent with respect to the organic alkali metal compound.

The temperature of the above polymerization reaction is usually from −80 to 150° C., preferably from 0 to 100° C. and more preferably from 10 to 90° C. The polymerization method may be either a batch method or a continuous method.

The polymerization reaction may be stopped by adding a terminating agent such as methanol and isopropanol to the reaction system. From the resulting polymerization reaction solution, the polymer (B) can be isolated by pouring the resulting polymerization reaction solution into a poor solvent such as methanol to precipitate the polymer (B) or by washing the resulting polymerization reaction solution with water, and then separating and drying the polymer (B).

{Modified Polymer}

The polymer (B) may be a diene polymer (B) having no functional group or the polymer (B) may be subjected to modification treatment. Examples of a functional group used in the modification treatment include an amino group, an amide group, an imino group, an imidazole group, a urea group, an alkoxysilyl group, a hydroxyl group, an epoxy group, an ether group, a carboxyl group, a carbonyl group, a mercapto group, an isocyanate group, a nitrile group and an acid anhydride group.

As the method for producing the modified diene polymer, there may be used, for example, the method in which before adding the terminating agent, a coupling agent such as tin tetrachloride, dibutyl tin chloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying agent such as 4,4'-bis(diethylamino)benzophenone, N-vinyl pyrrolidone, N-methyl pyrrolidone, 4-dimethylaminobenzylidene aniline and dimethyl imidazolidinone, or the other modifying agent as described in JP 2011-132298A is added to the polymerization reaction system. Further, the isolated polymer may be grafted with maleic anhydride or the like.

In the modified diene polymer, the site of the polymer into which the functional group is introduced may be either a chain end or a side chain of the polymer. In addition, these functional groups may be used in combination of any two or more thereof. The modifying agent may be used in an amount of from 0.01 to 100 mol equivalent with respect to the organic alkali metal compound.

<Filler (C)>

As the filler (C), at least one of carbon black and silica is preferably used.

[Carbon Black]

Examples of the usable carbon black include carbon blacks such as furnace black, channel black, thermal black, acetylene black and Ketjen black. Among these carbon blacks, from the viewpoints of a high curing rate and an improved mechanical strength of the rubber composition, preferred is furnace black.

The carbon black preferably has an average particle size of from 5 to 100 nm, more preferably from 5 to 80 nm, still more preferably 5 to 70 nm in view of improving the dispersibility, mechanical strength and hardness.

Examples of commercially available furnace black as the carbon black having an average particle size of from 5 to 100 nm include "DIABLACK" available from Mitsubishi Chemical Corp., and "SEAST" available from Tokai Carbon Co., Ltd. Examples of commercially available acetylene black include "DENKABLACK" available from Denki Kagaku Kogyo K.K. Examples of commercially available Ketjen black include "ECP600JD" available from Lion Corp.

The carbon black may be subjected to an acid treatment with nitric acid, sulfuric acid, hydrochloric acid or a mixed acid thereof or may be subjected to a heat treatment in the presence of air for a surface oxidation treatment thereof, from the viewpoint of improving a wettability or a dispersibility of the carbon black (C) in the rubber component (A) and the polymer (B). In addition, from the viewpoint of improving a mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbonates (such as, for example, $B_4C$ and $B_6C$), boron nitride (such as BN) and other boron compounds.

The particle size of the carbon black may be controlled by pulverization or the like. In order to pulverize the carbon black (C), there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like. The average particle size of the carbon black can be determined by measuring the diameters of the particles with a transmission electron microscope and calculating the average thereof.

[Silica]

Examples of the silica include wet silica (hydrous silicate), dry silica (silicic anhydride), calcium silicate and aluminum silicate. Among these silica, wet silica is preferred in view of further improving the processability, and mechanical strength and abrasion resistance of the rubber after vulcanization. The silica may be used individually, or two or more of them may be used in combination.

The average particle size of the silica is preferably from 0.5 to 200 nm, more preferably from 5 to 150 nm, still more preferably from 10 to 100 nm in view of further improving the processability and rolling resistance performance, mechanical strength and abrasion resistance of the rubber after vulcanization.

The average particle size of the silica can be determined by measuring the diameters of the particles with a transmission electron microscope and calculating the average thereof.

The content of the filler (C) to 100 parts by mass of the rubber component (A) is from 20 to 150 parts by mass, preferably from 25 to 130 parts by mass, still more preferably from 25 to 100 parts by mass. When the content of the filler (C) is within the above-specified range, the processability and rolling resistance performance, mechanical strength and abrasion resistance of the rubber after vulcanization are improved.

[Other Fillers]

The rubber composition of the present invention may further contain a filler other than the carbon black and silica as required for the purpose of improving the mechanical strength, improving physical properties such as heat resistance and weatherability, adjusting hardness, promoting economical efficiency and the like.

The filler other than the carbon black and silica may be appropriately selected depending on the use, and one or more of organic fillers and inorganic fillers such as clay, talc, mica, calcium carbonate, magnesium hydroxide, aluminum hydroxide, barium sulfate, titanium oxide, glass fibers, fibrous fillers and glass balloon may be used.

When the rubber composition of the present invention contains the filler, the content thereof is preferably from 0.1 to 120 parts by mass, more preferably from 5 to 90 parts by mass, still more preferably from 10 to 80 parts by mass with respect to 100 parts by mass of the rubber component (A).

When the content of the filler is within the above-specified range, the mechanical strength is further improved.

<Vulcanizing Agent (D)>

The rubber composition of the present invention contains from 0.1 to 10 parts by mass of a vulcanizing agent (D) with respect to 100 parts by mass of the rubber component (A). Examples of the vulcanizing agent (D) include sulfur and sulfur compounds. These may be used individually or two or more of them may be used in combination. The content of the vulcanizing agent (D) is preferably from 0.5 to 10 parts by mass, more preferably from 0.8 to 5 parts by mass with respect to 100 parts by mass of the rubber component (A).

<Vulcanization Accelerator (E)>

The rubber composition of the present invention contains from 0.1 to 15 parts by mass of a vulcanization accelerator (E) with respect to 100 parts by mass of the rubber component (A). Examples of the vulcanization accelerator include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. Examples of the guanidine compounds include 1,3-diphenylguanidine; examples of the sulfenamide compounds include N-(tert-butyl)-2-benzothiazolesulfenamide and N-cyclohexyl-2-benzothiazolyl sulfenamide; examples of the thiuram compounds include tetrabutylthiuram disulfide. These compounds may be used individually or two or more of them may be used in combination. The content of the vulcanization accelerator (E) is preferably from 0.1 to 10 parts by mass with respect to 100 parts by mass of the rubber component (A).

<Vulcanization Aid (F)>

The rubber composition of the present invention contains from 0.1 to 15 parts by mass of a vulcanization aid (F) with respect to 100 parts by mass of the rubber component (A). Examples of the vulcanization aid (F) include aliphatic acids such as stearic acid; metal oxides such as zinc oxide; and metal salts of aliphatic acids such as zinc stearate. These compounds may be used individually or two or more of them may be used in combination. The content of the vulcanization aid is preferably from 1 to 10 parts by mass with respect to 100 parts by mass of the rubber component (A).

<Optional Components>

(Silane Coupling Agent)

In cases where the rubber composition of the present invention contains silica, the rubber composition preferably contains a silane coupling agent. Examples of the silane coupling agent include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylatemonosulfide and 3-trimethoxysilylpropylmethacrylatemonosulfide.

Examples of the mercapto compounds include 3-mercaptopropyltrimethoxysilane, 3-mercaptopropyltriethoxysilane 2-mercaptoethyltrimethoxysilane and 2-mercaptoethyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane 2-chloroethyltrimethoxysilane and 2-chloroethyltriethoxysilane.

These silane coupling agents may be used individually or two or more of them may be used in combination. In view of the high effect and cost, bis(3-triethoxysilylpropyl) disulfide bis(3-triethoxysilylpropyl) tetrasulfide and 3-mercaptopropyltrimethoxysilane are preferred.

In cases where the rubber composition of the present invention contains a silane coupling agent, the content of the silane coupling agent with respect to 100 parts by mass of the silica is preferably from 0.1 to 30 parts by mass, more preferably from 0.5 to 20 parts by mass, still more preferably from 1 to 15 parts by mass. When the content of the silane coupling agent is within the above-specified range, the dispersibility, coupling effect, reinforcing effect and the abrasion resistance are improved.

The rubber composition of the present invention may contain, as required, as a softener, for the purpose of improving the processability and flowability, in an amount not adversely affecting the effects of the present invention, a processed oil such as silicone oil, aroma oil, TDAE (Treated Distilled Aromatic Extracts), MES (Mild Extracted Solvates), RAE (Residual Aromatic Extracts), paraffin oil or naphthene oil; and a resin component such as an aliphatic hydrocarbon resin, alicyclic hydrocarbon resin, C9 resin, rosin resin, chroman-indene resin or phenol resin. In cases where the rubber composition of the present invention contains the processed oil as a softener, the content thereof is preferably less than 50 parts by mass with respect to 100 parts by mass of the rubber component (A).

The rubber composition of the present invention may also contain, if required, one or more additives selected from the group consisting of an antioxidant, an oxidation inhibitor, a lubricant, a light stabilizer, a scorch retarder, a processing aid, a colorant such as pigments and coloring matters, a flame retardant, an antistatic agent, a delustering agent, an anti-blocking agent, an ultraviolet absorber, a release agent, a foaming agent, an antimicrobial agent, a mildew-proofing agent and a perfume, for the purposes of improving a weathering resistance, a heat resistance, an oxidation resistance or the like of the resulting rubber composition, unless the effects of the present invention are adversely influenced.

Examples of the oxidation inhibitor include hindered phenol compounds, phosphorus compounds, lactone compounds and hydroxyl compounds.

Examples of the antioxidant include amine-ketone compounds, imidazole compounds, amine compounds, phenol compounds, sulfur compounds and phosphorus compounds, more specifically "NOCRAC 6C" ((N-phenyl-N'-(1,3-dimethylbutyl)-p-phenylenediamine) commercially available from Ouchi Shinko Chemical Industrial Co., Ltd. and "ANTAGE RD" ((2,2,4-trimethyl-1,2-dihydroquinoline polymer) commercially available from Kawaguchi Chemical Industry Co., Ltd.

Examples of the lubricant include "EF44" available from Struktol, "HT266" available from Struktol, "KAOWAX EB-FF" available from Kao Corporation, and "DIAMID O-200" available from Nippon Kasei Chemical Co., Ltd.

The rubber composition of the present invention can be vulcanized under the conditions described below using the above vulcanizing agent (D).

The rubber composition of the present invention preferably has a high vulcanization rate. That is, the time required for vulcanization (90% vulcanization time) is preferably short. If the vulcanization rate of the rubber composition of the present invention is high, the rate of increase in the viscosity of the rubber composition during vulcanizing is high, and the additives such as plasticizer, vulcanizing agent, vulcanization aid and antioxidant in the rubber composition hardly bleed to the surface of the rubber, so that the contamination of the mold for processing is suppressed. In the present specification, the vulcanization rate of the rubber composition is defined as the time required for reaching a vulcanization degree of 90% determined by measuring the torque of the rubber composition at 180° C. using an oscillating type curemeter (CURELASTOMETER) according to JIS K 6300-2. The vulcanization rate of the rubber composition is preferably 10 minutes or less, more preferably 5 minutes or less. The lower limit is not restricted and usually 1 minute or more.

The rubber composition of the present invention may be crosslinked by adding a crosslinking agent in addition to the vulcanization by the above vulcanizing agent (D). Examples of the crosslinking agent include oxygen, organic peroxides, phenol resins, amino resins, quinones, quinone dioxime derivatives, halogen compounds, aldehyde compounds, alcohol compounds, epoxy compounds, halogenated metals, organic halogenated metals and silane compounds. These compounds may be used individually or two or more of them may be used in combination. The content of the crosslinking agent is preferably from 0.1 to 10 parts by mass with respect to 100 parts by mass of the rubber component (A).

The method for producing the rubber composition of the present invention is not particularly limited. The rubber composition can be obtained by uniformly mixing the respective components. The method of uniformly mixing the respective components may be carried out using a closed type kneader of a tangential type or a meshing type such a kneader rudder, a Brabender, a Banbury mixer and an internal mixer, a single-screw extruder, a twin-screw extruder, a mixing roll, a roller or the like in a temperature range of usually from 70 to 270° C.

[Vulcanized Rubber]

The vulcanized rubber of the present invention is one obtained by vulcanizing the rubber composition of the present invention. The conditions and the method for vulcanization are not restricted, and the vulcanization is preferably carried out using a vulcanization mold under heat and pressure, at a vulcanization temperature of from 120 to 200° C. at a vulcanization pressure of from 0.5 to 2.0 MPa.

The extraction ratio of the polymer (B) contained in the vulcanized rubber is preferably 20% by mass or less, more preferably 15% by mass or less, still more preferably 10% by mass or less.

The extraction ratio can be calculated from the amount of the extracted polymer (B) when 2 g of the vulcanized rubber is extracted with 400 mL of toluene at 23° C. for 48 hours

[Tire]

The tire of the present invention is produced by using the rubber composition of the present invention at least in a part thereof, and therefore can exhibit a good mechanical strength and an excellent rolling resistance performance. Further, since the tire using the rubber composition of the present invention has a low-migration of the plasticizer and so on, characteristics such as the mechanical strength can be maintained even when the tire is used for a long time. Still further, since the bleeding-out of the plasticizer and so on (not only the diene polymer (B), but also the additives such as the vulcanizing agent, vulcanization aid and antioxidant) to the surface of the rubber is suppressed, the contamination of the mold for processing is also suppressed.

EXAMPLES

The present invention will be described in more detail below by referring to the following examples. It should be noted, however, that the following examples are only illustrative and not intended to limit the invention thereto.

The components used in the Examples and Comparative Examples are as follows:

Rubber Component (A)
   natural rubber (1): "SMR20" (natural rubber made in Malaysia)
   natural rubber (2): "STR20" (natural rubber made in Thailand)
   styrene butadiene rubber (1): "JSR1500" (available from JSR Corporation)
     Mw=450,000
     styrene content=23.5% by mass
     (produced by emulsion polymerization method) styrene butadiene rubber (2): "TUFDENE 1000" (available from Asahi Kasei Chemicals Corporation)
     weight average molecular weight (Mw)=370,000
     styrene content=18% by mass
     (produced by solution polymerization method) butadiene rubber: "BR01" (available from JSR Corporation)
     Mw=550,000
     cis isomer content=95% by mass
     vinyl content=2.5% by mass
polymer (B): the polymer produced in Production Examples 1-6 below
Filler (C)
   carbon black
   C-1: DIABLACK H (available from Mitsubishi Chemical Corporation)
     (average diameter 30 nm) (ASTM N330)
   C-2: DIABLACK I (available from Mitsubishi Chemical Corporation)
     (average diameter 20 nm) (ASTM N220)
   C-3: "SEAST V" (available from Tokai Carbon Co., Ltd.)
     (average particle size 60 nm) (ASTM N660)
   silica:ULTRASIL7000GR (available from Evonik Duggssa Japan)
     (wet silica: average particle size 14 nm)
Vulcanizing Agent (D): sulfur (Sulfur fine powder 200 mesh available from Tsurumi Chemical Industry Co., Ltd.
Vulcanization Accelerator (E)
   vulcanization accelerator (E-1): "NOCCELER NS-P" (available from Ouchi Shinko Chemical Industrial Co., Ltd.) (N-(tert-butyl)-2-benzothiazolesulfenamide)
   vulcanization accelerator (E-2): "NOCCELER CZ-G" (available from Ouchi Shinko Chemical Industrial Co., Ltd.) (N-cyclohexyl-2-benzothiazolyl sulfenamide)

vulcanization accelerator (E-3): "NOCCELER D (available from Ouchi Shinko Chemical Industrial Co., Ltd.) (1,3-diphenylguanidine)

vulcanization accelerator (E-4): "NOCCELER TBT-N (available from Ouchi Shinko Chemical Industrial Co., Ltd.) (tetrabutylthiuram disulfide)

vulcanization aid (F)

stearic acid: "LUNAC S-20" (available from Kao Corporation)

zinc oxide: Zinc oxide available from Sakai Chemical Industry Co., Ltd.

Optional Components

TDAE: VivaTec500 (available from H&R)

Aliphatic hydrocarbon resin: "ESCOREZ 1102" available from Exxon Mobil Corporation Silane coupling agent (1): Si75 (available from Evonik Duggssa Japan)

Silane coupling agent (2): Si69 (available from Evonik Duggssa Japan)

Antioxidant (1): "NOCRAC 6C" (available from Ouchi Shinko Chemical Industrial Co., Ltd.) (N-phenyl-N'-(1,3-dimethylbutyl)-p-phenylenediamine)

Antioxidant (2): "ANTAGE RD" available from Kawaguchi Chemical Industry Co., Ltd.) (2,2,4-trimethyl-1,2-dihydroquinoline polymer)

Wax: "SUNTIGHT S" (available from Seiko Chemical Co., Ltd.)

Production Example 1

Production of Polyisoprene (B-1)

A pressure reaction vessel previously purged with nitrogen and then dried was charged with 600 g of hexane and 13.9 g of n-butyl lithium (in the form of a 17% by mass hexane solution). The contents of the reaction vessel were heated to 70° C., and 1370 g of isoprene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polyisoprene (B-1). Various properties of the thus obtained polyisoprene (B-1) are shown in Table 1.

Production Example 2

Production of Polyisoprene (B-2)

A pressure reaction vessel previously purged with nitrogen and then dried was charged with 600 g of hexane and 44.9 g of n-butyl lithium (in the form of a 17% by mass hexane solution). The contents of the reaction vessel were heated to 70° C., and 2050 g of isoprene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polyisoprene (B-2). Various properties of the thus obtained polyisoprene (B-2) are shown in Table 1.

Production Example 3

Production of Polybutadiene (B-3)

A pressure reaction vessel previously purged with nitrogen and then dried was charged with 600 g of hexane and 11.0 g of n-butyl lithium (in the form of a 17% by mass hexane solution). The contents of the reaction vessel were heated to 70° C., and 730 g of butadiene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polybutadiene (B-3). Various properties of the thus obtained polybutadiene (B-3) are shown in Table 1.

The methods for measuring the weight average molecular weight (Mw), molecular weight distribution (Mw/Mn), melt viscosity, vinyl content and glass transition temperature were as follows:

(Method for Measuring Weight Average Molecular Weight and Molecular Weight Distribution)

The Mw and the Mw/Mn of the polymer (B) were measured by GPC (gel permeation chromatography) in terms of a molecular weight of polystyrene as a reference standard substance. The measuring apparatuses and conditions are as follows.

Apparatus: GPC device "GPC8020" available from Tosoh Corporation Separating column: "TSKgelG4000HXL" available from Tosoh Corporation Detector: "RI-8020" available from Tosoh Corporation Eluent: Tetrahydrofuran Eluent flow rate: 1.0 mL/min Sample concentration: 5 mg/10 mL Column temperature: 40° C.

(Method for Measuring Melt Viscosity)

The melt viscosity of the polymer (B) was measured at 38° C. using a Brookfield viscometer available from Brookfield Engineering Labs. Inc.

(Method for Measuring Vinyl Content)

A solution prepared by dissolving 50 mg of the polymer (B) in 1 mL of $CDCl_3$ was subjected to $^1$H-NMR measurement at 400 MHz at a cumulative frequency of 512 times, and the vinyl content was calculated from the obtained chart.

(Method for Measuring Glass Transition Temperature)

Ten milligrams of the polymer (B) were sampled in an aluminum pan, and a thermogram of the sample was obtained at temperature rise rate of 10° C./min by differential scanning calorimetry (DSC), and the value at a peak top observed in the DDSC curve was determined as a glass transition temperature of the polymer (B).

TABLE 1

| | Diene polymer | Weight average molecular weight ($\times 10^3$) (Mw) | Molecular weight distribution Mw/Mn | Vinyl content (by mass) | Glass transition temperature (° C.) | Melt viscosity (38° C.) (Pa·s) |
|---|---|---|---|---|---|---|
| Production Example 1 | Polyisoprene (B-1) | 60 | 1.1 | 7 | −63 | 480 |

TABLE 1-continued

| Diene polymer | | Weight average molecular weight (×10³) (Mw) | Molecular weight distribution Mw/Mn | Vinyl content (by mass) | Glass transition temperature (° C.) | Melt viscosity (38° C.) (Pa · s) |
|---|---|---|---|---|---|---|
| Production Example 2 | Polyisoprene (B-2) | 32 | 1.1 | 7 | −63 | 74 |
| Production Example 3 | Polybutadiene (B-3) | 45 | 1.1 | 10 | −93 | 200 |

Examples 1 to 3 and Comparative Examples 1 to 7

The rubber component (A), polymer (B), filler (C), TDAE, aliphatic hydrocarbon resin, vulcanization aid (F) and the antioxidant were supplied to a closed type Banbury mixer at a mixing ratio (parts by mass) shown in Table 2, and the mixture was kneaded at a start temperature of 60° C. to attain a resin temperature of 160° C. for 6 minutes. The kneaded mixture was taken out of the mixer and allowed to cool to room temperature. After placing the mixture in a mixing roll, the vulcanizing agent (D) and the vulcanization accelerator (E) were added, and the resulting mixture was kneaded at 60° C. for 6 minutes to obtain a rubber composition. The Mooney viscosity of the thus obtained rubber composition was measured by the method described below.

The obtained rubber composition was subjected to a press molding (145° C., 17 to 19 minutes) to form a vulcanized rubber sheet (thickness 2 mm), and the rolling resistance performance, hardness, tensile strength at break and the extraction ratio of the plasticizer were evaluated in accordance with the method described below. The results are shown in Table 2.

The methods for carrying out the respective evaluations are as follows:
(1) Mooney Viscosity As an index of the processability of the rubber composition, the Mooney viscosity (ML1+4) of the rubber composition before being cured was measured at 100° C. according to JIS K6300. The values of the respective Examples and Comparative Examples are relative values based on 100 as the value of Comparative Example 7. A smaller Mooney viscosity value indicates a better processability.
(2) Rolling Resistance Performance Each of the sheets prepared in Examples and Comparative Examples was cut into a test piece having a size of 40 mm in length×7 mm in width. The thus obtained test piece was subjected to measurement of tan δ as an index of the rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples in Table 2 are relative values based on 100 as the value of Comparative Example 7. A smaller value indicates a better rolling resistance performance of the rubber composition.
(3) Hardness According to JIS K6253, the hardness of each of the sheets prepared in Examples and Comparative Examples was measured using a type-A hardness tester, and the thus measured hardness was used as an index of the flexibility of the rubber composition. When the hardness value is less than 50, a tire produced from the rubber composition suffers from large deformation and therefore is deteriorated in steering stability.
(4) Tensile Strength at Break Each of the rubber compositions prepared in Examples and Comparative Examples was punched into a dumbbell No. 3-shaped test piece according to JIS, and the obtained test piece was subjected to measurement of the tensile strength at break thereof according to JIS K 6251 using a tensile tester available from Instron Corp. The values of the respective Examples and Comparative Examples are relative values based on 100 as the value of Comparative Example 7. A larger value indicates a higher tensile strength at break of the rubber composition.
(5) Extraction Ratio of Plasticizer (Polymer (B) and so on)

Two grams of each of the vulcanized rubbers prepared by press-molding in Examples and Comparative Examples were extracted with 400 mL of toluene at 23° C. for 48 hours, and the extraction ratio of the polymer (B) extracted from the vulcanized rubber was measured. In Comparative Examples 1 to 6, the extraction ratio of TDAE or aliphatic hydrocarbon resin contained in the rubber composition was measured. A lower extraction ratio indicates a lower migration of the plasticizer.

TABLE 2

| | | | Example | | | Comparative Example | | | | | | |
|---|---|---|---|---|---|---|---|---|---|---|---|---|
| | | | 1 | 2 | 3 | 1 | 2 | 3 | 4 | 5 | 6 | 7 |
| Mixing ratio (parts by mass) | (A) Component | Natural rubber (1) | 100 | 100 | 100 | 100 | 100 | 100 | 100 | 100 | 100 | 100 |
| | (B) Component | Polyisoprene (B-1) | 1 | 5 | 10 | | | | | | | |
| | | TDAE | | | | 1 | 5 | 10 | | | | |
| | | Resin (ESCOREZ1102) | | | | | | | 1 | 5 | 10 | |
| | (C) Component | Carbon black (C-1) | 50 | 50 | 50 | 50 | 50 | 50 | 50 | 50 | 50 | 50 |
| | (D) Component | Sulfur | 1.5 | 1.5 | 1.5 | 1.5 | 1.5 | 1.5 | 1.5 | 1.5 | 1.5 | 1.5 |
| | (E) Component | Vulcanization accelerator (E-1) | 1.2 | 1.2 | 1.2 | 1.2 | 1.2 | 1.2 | 1.2 | 1.2 | 1.2 | 1.2 |
| | (F) Component | Stearic acid | 2 | 2 | 2 | 2 | 2 | 2 | 2 | 2 | 2 | 2 |
| | | Zinc oxide | 3.5 | 3.5 | 3.5 | 3.5 | 3.5 | 3.5 | 3.5 | 3.5 | 3.5 | 3.5 |

TABLE 2-continued

|  |  |  | Example | | | Comparative Example | | | | | | |
|---|---|---|---|---|---|---|---|---|---|---|---|---|
|  |  |  | 1 | 2 | 3 | 1 | 2 | 3 | 4 | 5 | 6 | 7 |
|  | Optional | Antioxidant (1) | 1 | 1 | 1 | 1 | 1 | 1 | 1 | 1 | 1 | 1 |
|  | component | Antioxidant (2) | 1 | 1 | 1 | 1 | 1 | 1 | 1 | 1 | 1 | 1 |
| Properties |  | Mooney viscosity (Relative value) | 100 | 92 | 81 | 100 | 90 | 75 | 100 | 92 | 75 | 100 |
|  |  | Rolling resistance performance (60° C. tanδ) (Relative value) | 100 | 105 | 109 | 100 | 107 | 115 | 103 | 117 | 125 | 100 |
|  |  | Hardness (Type-A) | 65 | 63 | 59 | 66 | 63 | 59 | 66 | 63 | 59 | 66 |
|  |  | Tensile strength at break (Relative value) | 98 | 98 | 93 | 98 | 98 | 91 | 99 | 99 | 92 | 100 |
|  |  | Extraction ratio of the plasticizer (% by mass) | 4 | 5 | 5 | 99 | 98 | 98 | 80 | 85 | 86 | — |

By comparing Example 1 with Comparative Example 1 or 4, Example 2 with Comparative Example 2 or 5, and Example 3 with Comparative Example 3 or 6, it can be seen that a rubber composition which has a small Mooney viscosity and a good processability, with which the decrease in the hardness or mechanical strength is suppressed, and which is excellent in low-migration property and rolling resistance performance can be obtained when the mixing ratio of the polymer (B) is from 0.1 to 50 parts by mass with respect to 100 parts by mass of the rubber component (A).

Examples 4 to 9, Comparative Examples 8 to 12

Rubber compositions were prepared in the same manner as in Example 1 except that the mixing ratios (parts by mass) of the respective components were as shown in Table 3 or Table 4. The Mooney viscosities of the obtained rubber compositions were measured by the method described above.

Each of the obtained rubber compositions was subjected to a press molding (145° C., 10 to 30 minutes) to form a vulcanized rubber sheet (thickness 2 mm), and the rolling resistance performance, hardness, tensile strength at break and the extraction ratio of the plasticizer were evaluated by the methods described above. The results are shown in Table 3 or 4.

The values of the Mooney viscosity, rolling resistance performance and tensile strength at break shown in Table 3 are the relative values taking the values of Comparative Example 8 as 100, respectively, and the values of the Mooney viscosity, rolling resistance performance and tensile strength at break shown in Table 4 are the relative values taking the values of Comparative Example 12 as 100, respectively.

TABLE 3

|  |  |  | Example | | | Comparative Example | | |
|---|---|---|---|---|---|---|---|---|
|  |  |  | 4 | 5 | 6 | 8 | 9 | 10 |
| Mixing ratio (parts by mass) | (A) Component | Natural rubber (1) | 100 | 100 | 100 | 100 | 100 | 100 |
|  | (B) Component | Polyisoprene (B-1) | 3 | 3 | 3 |  |  |  |
|  |  | TDAE |  |  |  | 3 | 3 | 3 |
|  | (C) Component | Carbon black (C-1) | 45 |  |  | 45 |  |  |
|  |  | Carbon black (C-2) |  | 45 |  |  | 45 |  |
|  |  | Carbon black (C-3) |  |  | 55 |  |  | 55 |
|  | (D) Component | Sulfur | 1.5 | 1.5 | 1.5 | 1.5 | 1.5 | 1.5 |
|  | (E) Component | Vulcanization accelerator (E-1) | 1.2 | 1.2 | 1.2 | 1.2 | 1.2 | 1.2 |
|  | (F) Component | Stearic acid | 2 | 2 | 2 | 2 | 2 | 2 |
|  |  | Zinc oxide | 3.5 | 3.5 | 3.5 | 3.5 | 3.5 | 3.5 |
|  | Optional | Antioxidant (1) | 1 | 1 | 1 | 1 | 1 | 1 |
|  | component | Antioxidant (2) | 1 | 1 | 1 | 1 | 1 | 1 |
| Properties |  | Mooney viscosity (Relative value) | 98 | 110 | 79 | 100 | 111 | 78 |
|  |  | Rolling resistance performance (60° C. tanδ) (Relative value) | 100 | 121 | 64 | 100 | 131 | 61 |
|  |  | Hardness (Type-A) | 62 | 64 | 60 | 61 | 62 | 60 |
|  |  | Tensile strength at break (Relative value) | 101 | 107 | 81 | 100 | 106 | 84 |
|  |  | Extraction ratio of the plasticizer (% by mass) | 5 | 5 | 6 | 97 | 97 | 98 |

By comparing Example 4 with Comparative Example 8, Example 5 with Comparative Example 9, and Example 6 with Comparative Example 10, it can be seen that a rubber composition having an excellent processability, hardness, mechanical strength, rolling resistance performance and low-migration performance can be obtained by containing a prescribed amount of polymer (B) and using a carbon black having an average particle size within the range of from 5 to 100 nm.

TABLE 4

| | | | Example | | | Comparative Example | |
|---|---|---|---|---|---|---|---|
| | | | 7 | 8 | 9 | 11 | 12 |
| Mixing ratio (parts by mass) | (A) Component | Natural rubber (1) | 100 | 100 | 100 | 100 | 100 |
| | (B) Component | Polyisoprene (B-1) | 10 | | | | |
| | | Polyisoprene (B-2) | | 10 | | | |
| | | Polybutadiene (B-3) | | | 10 | | |
| | | TDAE | | | | 10 | |
| | (C) Component | Carbon black (C-1) | 50 | 50 | 50 | 50 | 50 |
| | (D) Component | Sulfur | 1.5 | 1.5 | 1.5 | 1.5 | 1.5 |
| | (E) Component | Vulcanization accelerator (E-1) | 1 | 1 | 1 | 1 | 1.2 |
| | (F) Component | Stearic acid | 2 | 2 | 2 | 2 | 2 |
| | | Zinc oxide | 3.5 | 3.5 | 3.5 | 3.5 | 3.5 |
| | Optional component | Antioxidant (1) | 1 | 1 | 1 | 1 | 1 |
| Properties | | Mooney viscosity (Relative value) | 80 | 79 | 80 | 80 | 100 |
| | | Rolling resistance performance (60° C. tanδ) (Relative value) | 99 | 102 | 104 | 105 | 100 |
| | | Hardness (Type-A) | 60 | 59 | 58 | 59 | 64 |
| | | Tensile strength at break (Relative value) | 100 | 98 | 99 | 94 | 100 |
| | | Extraction ratio of the plasticizer (% by mass) | 4 | 10 | 5 | 98 | — |

By comparing Examples 7 to 9 with Comparative Example 11, it can be seen that a rubber composition having an excellent processability, hardness, mechanical strength, rolling resistance performance and low-migration performance can be obtained when the weight average molecular weight of the polymer (B) is from 2,000 to 100,000.

Example 10, Comparative Examples 13 and 14

Rubber compositions were prepared in the same manner as in Example 1 except that the mixing ratios (parts by mass) of the respective components were as shown in Table 5. The Mooney viscosities of the obtained rubber compositions were measured by the method described above.

Each of the obtained rubber compositions was subjected to a press molding (145° C., 40 minutes) to form a vulcanized rubber sheet (thickness 2 mm), and the rolling resistance performance, hardness, tensile strength at break and the extraction ratio were evaluated by the methods described above. The results are shown in Table 5.

The values of the Mooney viscosity, rolling resistance performance and tensile strength at break are the relative values taking the values of Comparative Example 14 shown in Table 5 as 100, respectively.

TABLE 5

| | | | Example | Comparative Example | |
|---|---|---|---|---|---|
| | | | 10 | 13 | 14 |
| Mixing ratio (parts by mass) | (A) Component | Styrene butadiene rubber (1) | 100 | 100 | 100 |
| | (B) Component | Polyisoprene (B-1) | 10 | | |
| | | TDAE | | 10 | 10 |
| | (C) Component | Carbon black (C-1) | 25 | 25 | 25 |
| | | Silica | 25 | 25 | 25 |
| | (D) Component | Sulfur | 1.5 | 1.5 | 1.5 |
| | (E) Component | Vulcanization accelerator (E-2) | 0.4 | 0.4 | 0.4 |

TABLE 5-continued

| | | | Example | Comparative Example | |
|---|---|---|---|---|---|
| | | | 10 | 13 | 14 |
| | | Vulcanization accelerator (E-3) | 0.3 | 0.3 | 0.3 |
| | | Vulcanization accelerator (E-4) | 1.2 | 1.2 | 1.2 |
| | (F) Component | Stearic acid | 1 | 1 | 1 |
| | | Zinc oxide | 3.5 | 3.5 | 3.5 |
| | Optional component | Silane coupling agent (1) | 2 | 2 | 2 |
| | | Antioxidant (1) | 1 | 1 | 1 |
| | | Antioxidant (2) | 1 | 1 | 1 |
| Properties | | Mooney viscosity (Relative value) | 74 | 71 | 100 |
| | | Rolling resistance performance (60° C. tanδ) (Relative value) | 105 | 105 | 100 |
| | | Hardness (Type-A) | 66 | 65 | 67 |
| | | Tensile strength at break (Relative value) | 100 | 100 | 100 |
| | | Extraction ratio of the plasticizer (% by mass) | 5 | 98 | — |

Since the rubber composition of Example 10 has a small Mooney viscosity and a good processability, in which the decrease in the hardness is suppressed, and is excellent in the rolling resistance performance and low-migration performance, the rubber composition can be suitably used as a rubber composition for forming tires.

Example 11 and Comparative Example 15

Rubber compositions were prepared in the same manner as in Example 1 except that the mixing ratios (parts by mass) of the respective components were as shown in Table 6. The Mooney viscosities of the obtained rubber compositions were measured by the method described above.

Each of the obtained rubber compositions was subjected to a press molding (145° C., 10 to 45 minutes) to form a vulcanized rubber sheet (thickness 2 mm), and the rolling resistance performance, hardness, tensile strength at break and the extraction ratio were evaluated by the methods described above. The results are shown in Table 6.

The values of the Mooney viscosity, rolling resistance performance and tensile strength at break are the relative values taking the values of Comparative Example 15 shown in Table 6 as 100, respectively.

TABLE 6

| | | | Example 11 | Comparative Example 15 |
|---|---|---|---|---|
| Mixing ratio (parts by mass) | (A) Component | Natural rubber (1) | 50 | 50 |
| | | Butadiene rubber | 50 | 50 |
| | (B) Component | Polyisoprene (B-1) | 3 | |
| | | TDAE | | 3 |
| | (C) Component | Carbon black (C-1) | 45 | 45 |
| | (D) Component | Sulfur | 1.2 | 1.2 |
| | (E) Component | Vulcanization accelerator (E-1) | 0.75 | 0.75 |
| | (F) Component | Stearic acid | 2 | 2 |
| | | Zinc oxide | 3.5 | 3.5 |
| | Optional component | Antioxidant (1) | 3 | 3 |
| | | Antioxidant (2) | 0.5 | 0.5 |
| | | Wax | 2 | 2 |
| Properties | Mooney viscosity (Relative value) | | 98 | 100 |
| | Rolling resistance performance (60° C. tanδ) (Relative value) | | 99 | 100 |
| | Hardness (Type-A) | | 57 | 56 |
| | Tensile strength at break (Relative value) | | 101 | 100 |
| | Extraction ratio of the plasticizer (% by mass) | | 4 | 97 |

Since the rubber composition of Example 11 has a small Mooney viscosity and a good processability, in which the decrease in the hardness is suppressed, and is excellent in the rolling resistance performance and low-migration performance, the rubber composition can be suitably used as a rubber composition for forming tires.

Production Example 4

Production of Polyisoprene (B-4)

A pressure reaction vessel previously purged with nitrogen and then dried was charged with 1500 g of cyclohexane and 49 g of sec-butyl lithium (in the form of a 10.5% by mass cyclohexane solution). The contents of the reaction vessel were heated to 70° C., and 1000 g of isoprene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polyisoprene (B-4). Various properties of the thus obtained polyisoprene (B-4) are shown in Table 7.

Production Example 5

Production of Polyisoprene (B-5)

A pressure reaction vessel previously purged with nitrogen and then dried was charged with 1500 g of cyclohexane and 978 g of sec-butyl lithium (in the form of a 10.5% by mass cyclohexane solution). The contents of the reaction vessel were heated to 70° C., and 1000 g of isoprene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polyisoprene (B-5). Various properties of the thus obtained polyisoprene (B-5) are shown in Table 7.

Production Example 6

Production of Polyisoprene (B-6)

A pressure reaction vessel previously purged with nitrogen and then dried was charged with 1100 g of hexane and 100 g of n-butyl lithium (in the form of a 17% by mass hexane solution) as an initiator. The contents of the reaction vessel were heated to 70° C., and 1100 g of butadiene was added thereto and polymerized for 1 hour. Methanol is added to the resulting polymerization reaction solution. And then the polymerization reaction solution was washed with water. After separating water from the thus washed polymerization reaction solution, the resulting solution was dried at 70° C. for 12 hours, thereby obtaining a polybutadiene (B-6). Various properties of the thus obtained polybutadiene (B-6) are shown in Table 7.

Measurement of Vulcanization Rate (t90) of Polymer (B)

In accordance with the conditions described in the specification, the polymer (B) and prescribed amounts of the additives were added to a Brabender set at 60° C., and the mixture was kneaded for 10 minutes. The torque of the mixture at 140° C. was measured in accordance with JIS K 6300-2 using an oscillating type curemeter (CURELASTOMETER) and the time required for reaching a vulcanization degree of 90% was measured, which time was defined as the vulcanization rate (t90) of the polymer (B). The results are shown in Table 7.

TABLE 7

| | Diene polymer | Weight average molecular weight ($\times 10^3$) (Mw) | Molecular weight distribution Mw/Mn | Vinyl content (by mass) | Melt viscosity (38° C.) (Pa·s) | Glass transition temperature (° C.) | Vulcanization rate (t90) (min) |
|---|---|---|---|---|---|---|---|
| Production Example 1 | Polyisoprene (B-1) | 60 | 1.1 | 7 | 480 | −63 | 15.5 |
| Production Example 2 | Polyisoprene (B-2) | 32 | 1.1 | 7 | 74 | −63 | 17.0 |
| Production Example 4 | Polyisoprene (B-4) | 20 | 1.1 | 7 | 15 | −62 | 21.8 |

TABLE 7-continued

| | Diene polymer | Weight average molecular weight (×10³) (Mw) | Molecular weight distribution Mw/Mn | Vinyl content (by mass) | Melt viscosity (38° C.) (Pa·s) | Glass transition temperature (° C.) | Vulcanization rate (t90) (min) |
|---|---|---|---|---|---|---|---|
| Production Example 5 | Polyisoprene (B-5) | 1 | 1.1 | 8 | 0.04 | −62 | could not be measured within 60 minutes |
| Production Example 6 | Polybutadiene (B-6) | 8 | 1.1 | 11 | 1.3 | −95 | could not be measured within 60 minutes |

Examples 12 to 16

The rubber component (A), polymer (B), filler (C), silane coupling agent, polybutadiene, TDAE, wax, vulcanization aid (F) and the antioxidant were supplied to a closed type Banbury mixer at a mixing ratio (parts by mass) shown in Table 8, and the mixture was kneaded at a start temperature of 60° C. to attain a resin temperature of 160° C. for 6 minutes. The kneaded mixture was taken out of the mixer and allowed to cool to room temperature. After placing the mixture in a mixing roll, the vulcanizing agent (D) and the vulcanization accelerator (E) were added, and the resulting mixture was kneaded at 60° C. for 6 minutes to obtain a rubber composition. The vulcanization rate, peeling strength, bleeding-out property of the obtained rubber composition were measured by the methods described below. The results are shown in Table 8.

Measurement of Vulcanization Rate of Rubber Composition

The torque at 180° C. of the rubber composition prepared according to the mixing ratio (parts by mass) shown in Table 8 was measured in accordance with JIS K 6300-2 using an oscillating type curemeter (CURELASTOMETER) and the time required for reaching a vulcanization degree of 90% was measured, which time was defined as the vulcanization rate of the rubber composition.

Peeling Strength (Peel Test (N/25 mm))

(1) An unvulcanized rubber is placed in an oven at 100° C. for 10 minutes to warm the rubber (2) The warmed unvulcanized rubber and an aluminum plate (75 mm×25 mm×1 mm) are stacked such that the upper surface of the unvulcanized rubber contact the aluminum plate.

(3) The resultant of (2) is placed in a mold having a thickness of 2 mm and vulcanization is performed at 180° C. for 10 minutes.

(4) After the vulcanization, the aluminum plate and the vulcanized rubber are peeled off and the aluminum plate is heated on a hot plate at 180° C. for 15 minutes.

(5) Using the aluminum plate of (4) again, the above operations (1) to (4) are repeated 10 times, and the aluminum plate after the 10th vulcanization is cooled to room temperature without peeling.

(6) After the cooling, the vulcanized rubber is cut into the size of the aluminum plate to prepare a test piece.

(7) The test piece obtained in (6) is measured for the peeling strength at 180° peeling when the vulcanized rubber sheet is peeled off from the aluminum plate using a tensile tester.

A smaller value indicates a weaker peeling strength, so that the smaller the value, the more preferred. If the peeling strength is weak, the molded article such as a tire is easily "released" from the mold, so that the breakage of the molded article is unlikely to occur.

Bleeding-Out Property (Mold Contamination Property)

The amount of the residual product on the surface of the aluminum plate after measuring the peeling strength was visually observed and evaluated in 3 ranks. A rank closer to Rank 1 indicates that the mold contamination is more suppressed.

(Evaluation)

1: There is no residual product at all on the surface of the aluminum plate.

2: A white and thin residual product is observed on a part or the entire of the surface of the aluminum plate.

3: A part of the vulcanized rubber remains on the surface of the aluminum plate after breakage.

TABLE 8

| | | | Example | | | | |
|---|---|---|---|---|---|---|---|
| | | | 12 | 13 | 14 | 15 | 16 |
| Mixing ratio (parts by mass) | (A) Component | Natural rubber (2) | 20 | 20 | 20 | 20 | 20 |
| | | Styrene butadiene rubber (2) | 80 | 80 | 80 | 80 | 80 |
| | (B) Component | Polyisoprene (B-1) | 30 | | | | |
| | | Polyisoprene (B-2) | | 30 | | | |
| | | Polyisoprene (B-4) | | | 30 | | |
| | | Polyisoprene (B-5) | | | | 30 | |
| | | Polybutadiene (B-6) | | | | | 30 |
| | (C) Component | Silica | 70 | 70 | 70 | 70 | 70 |
| | (D) Component | Sulfur | 1.5 | 1.5 | 1.5 | 1.5 | 1.5 |
| | (E) Component | Vulcanization accelerator (E-1) | 0.35 | 0.35 | 0.35 | 0.35 | 0.35 |
| | | Vulcanization accelerator (E-2) | 0.5 | 0.5 | 0.5 | 0.5 | 0.5 |
| | | Vulcanization accelerator (E-3) | 1.5 | 1.5 | 1.5 | 1.5 | 1.5 |
| | (F) Component | Stearic acid | 2 | 2 | 2 | 2 | 2 |
| | | Zinc oxide | 3.5 | 3.5 | 3.5 | 3.5 | 3.5 |

TABLE 8-continued

|  |  | Example | | | | |
|---|---|---|---|---|---|---|
|  |  | 12 | 13 | 14 | 15 | 16 |
| Optional component | Silane coupling agent (2) | 5.6 | 5.6 | 5.6 | 5.6 | 5.6 |
|  | Antioxidant (1) | 2 | 2 | 2 | 2 | 2 |
|  | Wax | 1 | 1 | 1 | 1 | 1 |
| Properties | Vulcanization rate of rubber composition [min] | 2.03 | 2.31 | 2.60 | 3.08 | 3.66 |
|  | Peeling strength [N/25 mm] | 0.6 | 4.1 | 11.4 | 18.7 | 22.0 |
|  | Bleeding-out property | 1 | 1 | 1 | 2 | 3 |

Since the rubber compositions of Examples 12 to 16 have a vulcanization rate of the polymer (B) of 25 minutes or less, the vulcanization rate of the obtained composition is also high, so that the amount of the residual product on the aluminum plate is small and the peeling strength when peeling the vulcanized rubber is also small, and thus the mold contamination property is excellent. Therefore, the rubber composition of the present invention can suitably be used as a rubber composition for tires. Further, by comparing Examples 14 to 16, it can be seen that polyisoprene has a higher vulcanization rate than polybutadiene, and the amount of the residual product on the aluminum plate is smaller and the peeling strength when the vulcanized rubber is peeled off is smaller.

The invention claimed is:

1. A vulcanized rubber obtained by vulvanizing a rubber composition, comprising:
    100 parts by mass of rubber component (A) comprising at least one of a synthetic rubber and a natural rubber;
    0.1 to 50 parts by mass of a diene polymer (B);
    20 to 150 parts by mass of a filler (C) which comprises silica;
    0.1 to 10 parts by mass of a vulcanizing agent (D);
    0.1 to 15 parts by mass of a vulcanization accelerator (E); and
    0.1 to 15 parts by mass of vulcanization aid (F),
    wherein
    the polymer (B) is a polyisoprene having no functional group,
    a melt viscosity of the diene polymer (B) at 38° C. is from 0.1 Pa·s to 3,000 Pa·s,
    a vulcanization rate (t90) of the diene polymer (B) measured under the measuring conditions below is 25 minutes or less:
    the measuring conditions being:
        To 100 parts by mass of the diene polymer (B), 70 parts by mass of carbon black of ASTM N330, 3.5 parts by mass of zinc oxide, 2 parts by mass of stearic acid, 1.5 parts by mass of sulfur, 1.2 parts by mass of N-(tert-butyl)-2-benzothiazole sulfenamide and 1 part by mass of N-phenyl-N'-(1,3-dimethylbutyl)-p-phenylenediamine are added, and a torque at 140° C. is measured using an oscillating type curemeter and vulcanization time to reach 90% vulcanization degree is measured, and
    wherein an extraction ratio of the polymer (B) contained in the vulcanized rubber when 2 g of the vulcanized rubber is extracted with 400 mL of toluene at 23° C. for 48 hours is 20% by mass or less.

2. The vulcanized rubber according to claim 1, wherein the diene polymer (B) has a weight average molecular weight (Mw) of 2,000 to 100,000.

3. The vulcanized rubber according to claim 1, wherein the diene polymer (B) has a glass transition temperature of −100 to 0° C.

4. The vulcanized rubber according to claim 1, wherein the filler (C) further comprises carbon black.

5. The vulcanized rubber according to claim 1, wherein the rubber component (A) comprises at least one synthetic rubber selected from the group consisting of a styrene butadiene rubber, a butadiene rubber and an isoprene rubber.

6. The vulcanized rubber according to claim 5, wherein the rubber component (A) comprises a styrene butadiene rubber having a weight average molecular weight (Mw) of 100,000 to 2,500,000.

7. The vulcanized rubber according to claim 5, wherein the rubber component (A) comprises a styrene butadiene rubber having a styrene content of 0.1 to 70% by mass.

8. The vulcanized rubber according to claim 5, wherein the rubber component (A) comprises a butadiene rubber which has a weight average molecular weight (Mw) of 90,000 to 2,000,000.

9. The vulcanized rubber according to claim 5, wherein the rubber component (A) comprises a butadiene rubber which has a vinyl content of 50% by mass or less.

10. A tire, comprising the vulcanized rubber of claim 1.

11. The vulcanized rubber according to claim 1, wherein the diene polymer (B) is a liquid polymer.

* * * * *